United States Patent
Eyer (12)

(10) Patent No.: US 9,247,198 B2
(45) Date of Patent: Jan. 26, 2016

(54) DATA TRANSPORT IN UNANNOUNCED STANDARD CAPTION SERVICE

(71) Applicant: Sony Corporation, Tokyo (JP)

(72) Inventor: Mark Eyer, Woodinville, WA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/275,231

(22) Filed: May 12, 2014

(65) Prior Publication Data

US 2014/0327825 A1    Nov. 6, 2014

Related U.S. Application Data

(63) Continuation of application No. 13/176,088, filed on Jul. 5, 2011, now Pat. No. 8,760,498.

(60) Provisional application No. 61/452,247, filed on Mar. 14, 2011.

(51) Int. Cl.
| | |
|---|---|
| H04N 7/088 | (2006.01) |
| H04N 13/00 | (2006.01) |
| H04N 21/488 | (2011.01) |

(Continued)

(52) U.S. Cl.
CPC ............ *H04N 7/0882* (2013.01); *H04N 13/007* (2013.01); *H04N 13/0022* (2013.01); *H04N 21/435* (2013.01); *H04N 21/4348* (2013.01); *H04N 21/4884* (2013.01); *H04N 21/816* (2013.01)

(58) Field of Classification Search
CPC ............ H04N 13/0048; H04N 19/597; H04N 13/0055; H04N 13/0062; H04N 13/007; H04N 21/816; H04N 21/4884; H04N 7/0882; H04N 13/0022; H04N 21/4348; H04N 21/435
See application file for complete search history.

(56) References Cited

U.S. PATENT DOCUMENTS

| | | | | |
|---|---|---|---|---|
| 5,200,823 | A | * | 4/1993 | Yoneda et al. ................. 348/473 |
| 5,519,443 | A | * | 5/1996 | Salomon et al. ............... 348/467 |

(Continued)

FOREIGN PATENT DOCUMENTS

CA          2 749 064          7/2010

OTHER PUBLICATIONS

U.S. Appl. No. 13/905,721, filed May 30, 2013, Kitahara et al.

(Continued)

*Primary Examiner* — Jay Patel
*Assistant Examiner* — Joseph Suh
(74) *Attorney, Agent, or Firm* — Oblon, McClelland, Maier & Neustadt, L.L.P.

(57) ABSTRACT

A method of processing disparity data for closed captions for three dimensional video involves receiving closed caption data including closed caption text within a first Standard service block having a service number in the range of 1-6; receiving closed caption disparity data within a Standard service block having a service number equal to n, where n is between 1 and 6; receiving a linkage field which associates each instance of said disparity data to a corresponding Standard service; parsing the disparity data from the closed caption data appearing in service number n; and processing the caption text and disparity data to produce an output suitable for defining a rendering of a three dimensional image on a display of the caption text at a z-axis position defined by the disparity data. This abstract is not to be considered limiting, since other embodiments may deviate from the features described in this abstract.

13 Claims, 6 Drawing Sheets

Variable Length Disparity Command

| | b7 | b6 | b5 | b4 | b3 | b2 | b1 | b0 | |
|---|---|---|---|---|---|---|---|---|---|
| | 0 | 0 | 0 | 1 | 0 | 0 | 0 | 0 | · EXT1 |
| 100 | 1 | 0 | 0 | 1 | 0 | 0 | 0 | 0 | · 0x90 |
| | t1 | t0 | 0 | s4 | s3 | s2 | s1 | s0 | · type<br>· length |
| | | | | caption_disparity_data | | | | | |

(51) Int. Cl.
*H04N 21/81* (2011.01)
*H04N 21/434* (2011.01)
*H04N 21/435* (2011.01)

(56) References Cited

U.S. PATENT DOCUMENTS

| | | | |
|---|---|---|---|
| 7,848,425 B2* | 12/2010 | Cho et al. | 375/240.16 |
| 7,999,820 B1* | 8/2011 | Weitkemper et al. | 345/566 |
| 8,595,783 B2 | 11/2013 | Dewa | |
| 8,705,933 B2 | 4/2014 | Eyer | |
| 2002/0140863 A1* | 10/2002 | Park | 348/569 |
| 2003/0035063 A1* | 2/2003 | Orr | 348/465 |
| 2004/0032980 A1 | 2/2004 | Harman | |
| 2004/0036806 A1* | 2/2004 | Katayama | 348/563 |
| 2006/0184994 A1 | 8/2006 | Eyer et al. | |
| 2008/0129864 A1* | 6/2008 | Stone et al. | 348/468 |
| 2009/0060055 A1 | 3/2009 | Blanchard et al. | |
| 2009/0249392 A1* | 10/2009 | Park | 725/38 |
| 2010/0157025 A1* | 6/2010 | Suh et al. | 348/51 |
| 2010/0183278 A1* | 7/2010 | Black et al. | 386/52 |
| 2010/0188572 A1 | 7/2010 | Card, II | |
| 2011/0088075 A1 | 4/2011 | Eyer | |
| 2011/0149035 A1* | 6/2011 | Tsukagoshi | 348/43 |
| 2011/0221863 A1* | 9/2011 | Eyer | 348/43 |
| 2011/0221873 A1* | 9/2011 | Eyer | 348/51 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0279644 A1* | 11/2011 | Suh et al. | 348/43 |
| 2011/0285817 A1* | 11/2011 | Tsukagoshi | 348/43 |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050473 A1* | 3/2012 | Suh et al. | 348/43 |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0145414 A1 | 6/2013 | Yamagishi | |
| 2013/0167171 A1 | 6/2013 | Kitazato et al. | |
| 2013/0191860 A1 | 7/2013 | Kitazato et al. | |
| 2013/0198768 A1 | 8/2013 | Kitazato | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0215327 A1 | 8/2013 | Kitazato et al. | |
| 2013/0250173 A1 | 9/2013 | Eyer | |
| 2013/0254824 A1 | 9/2013 | Eyer | |
| 2013/0258191 A1 | 10/2013 | Eyer | |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0291049 A1 | 10/2013 | Kitazato | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0020038 A1 | 1/2014 | Dewa | |
| 2014/0020042 A1 | 1/2014 | Eyer | |
| 2014/0040965 A1 | 2/2014 | Kitazato et al. | |
| 2014/0040968 A1 | 2/2014 | Kitazato et al. | |
| 2014/0043540 A1 | 2/2014 | Kitazato et al. | |
| 2014/0053174 A1 | 2/2014 | Eyer et al. | |
| 2014/0067922 A1 | 3/2014 | Yamagishi et al. | |
| 2014/0099078 A1 | 4/2014 | Kitahara et al. | |
| 2014/0122528 A1 | 5/2014 | Yamagishi | |

OTHER PUBLICATIONS

U.S. Appl. No. 13/930,814, filed Jun. 28, 2013, Fay.
U.S. Appl. No. 13/930,880, filed Jun. 28, 2013, Fay et al.
U.S. Appl. No. 13/927,667, filed Jun. 26, 2013, Yamagishi.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, Yamagishi.
U.S. Appl. No. 13/934,473, filed Jul. 3, 2013, Yamagishi.
U.S. Appl. No. 13/955,130, filed Jul. 31, 2013, Fay.
U.S. Appl. No. 13/963,138, filed Aug. 9, 2013, Fay et al.
U.S. Appl. No. 13/963,111, filed Aug. 9, 2013, Fay et al.
U.S. Appl. No. 14/046,543, filed Oct. 4, 2013, Fay et al.
U.S. Appl. No. 14/046,566, filed Oct. 4, 2013, Fay et al.
U.S. Appl. No. 14/196,432, filed Mar. 4, 2014, Eyer.
U.S. Appl. No. 14/253,474, filed Apr. 15, 2014, Kitazato et al.
International Search Report and the Written Opinion issued Jun. 20, 2014, in International Application No. PCT/US2012/029037 (filed Mar. 15, 2012).
Extended European Search Report issued Jun. 5, 2012, in European Patent Application No. 12155439.8.
Office Action issued Dec. 13, 2013, in Chinese Patent Application No. 201210036132.0 (with English-language Translation).
Holliman, "3D Display Systems," Draft v3, Department of Computer Science, University of Durham, Science Laboratories, South Road, Durham, DH1 3LE, Mar. 28, 2003, pp. 1-45.

* cited by examiner

Variable Length Disparity Command

| b7 | b6 | b5 | b4 | b3 | b2 | b1 | b0 | |
|----|----|----|----|----|----|----|----|---|
| 0  | 0  | 0  | 1  | 0  | 0  | 0  | 0  | · EXT1 |
| 1  | 0  | 0  | 1  | 0  | 0  | 0  | 0  | · 0x90 |
| t1 | t0 | 0  | s4 | s3 | s2 | s1 | s0 | · type<br>· length | caption_disparity_data

FIG. 7

DATA TRANSPORT IN UNANNOUNCED STANDARD CAPTION SERVICE

CROSS REFERENCE TO RELATED DOCUMENTS

This application is related to and claims priority benefit of U.S. application Ser. No. 13/176,088 filed Jul. 5, 2011, which is a non-provisional application of U.S. Provisional Application No. 61/452,247 filed Mar. 14, 2011 to Mark Eyer. This application is also related to U.S. Provisional Application No. 61/415,924, filed Nov. 22, 2010 entitled "Service Linkage to Caption Disparity Data Transport" to Mark Eyer, et al.; U.S. Provisional Application No. 61/415,457 filed Nov. 19, 2010 entitled "Disparity Data Signaling and Transport for 3D Captioning" to Mark Eyer, et al.; U.S. Provisional Application No. 61/346,652 filed May 20, 2010 entitled "Disparity Data Transport" to Mark Eyer, et al.; U.S. Provisional Application No. 61/313,612 filed Mar. 12, 2010 entitled "Disparity Data Transport" to Mark Eyer, et al.; U.S. Provisional Application No. 61/316,733 filed Mar. 23, 2010 entitled "Extended Command Stream for CEA-708 Captions" to Mark Eyer, et al.; and U.S. Provisional Application No. 61/378,792 filed Aug. 31, 2010 entitled "Efficient Transport of Frame-by-Frame Change in Captioning Disparity Data" to Mark Eyer; and the application is also related to U.S. Non-Provisional application Ser. Nos. 13/022,828, 13/022,817, and 13/022,810, which were each filed on Feb. 8, 2011; and each of the above applications are hereby incorporated by reference in their entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

When closed captions (CC) accompany a three dimensional (3D) stereoscopic video program, a standard is needed that defines where the captions appear in the z-axis (depth) and how this information is to be conveyed to the receiver. Without such signaling, the captions may not be optimally placed on a video display so as to not interfere with other video objects or be interfered with by other video objects.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

When closed captioning is rendered in the display of a 3D video program, the CC window and associated text is likely to be rendered in the plane of the screen unless steps are taken to render the window and text such that they appear at a different, more appropriate, perceived depth. An object in a scene within 3D content may be presented such that it appears to the viewer to be some distance in front of the plane of the display screen. If a captioning window positioned in depth at the plane of the display were to be placed on top of that object, a "depth violation" would occur. In such a case, the viewer is presented with conflicting depth cues, a situation that causes eye fatigue and discomfort. Since captioning may intersect in the z-axis with content in the scene if it is simply positioned at the screen plane, the presentation of captioning is preferably individually authored to the subject matter of the video presentation. In order to accomplish this, extra information can be sent along with the captions to define the perceived placement on the z-axis (a designated distance in front or behind the plane of the screen) of a window containing the caption text for effective presentation and to avoid interference with objects in the scene. A number of techniques can be devised to provide this information, but many have disadvantages.

Stereoscopic 3D television involves delivery to the display screen of separate views for the left and right eyes, coupled with a method to allow each of the viewer's eyes to see only the image intended for that eye. The illusion of depth is achieved when, for a given object, the left- and right-eye views differ in the horizontal position of that object's placement. An overview of the basic technology relating to three dimensional display systems is described in "3D Display Systems" by Dr. Nick Holliman, Department of Computer Science, University of Durham, Science Laboratories, South Road, Durham DH1 3LE, UK (see particularly pp. 10-11 and FIG. 5), which is hereby incorporated by reference in the document's entirety.

The term "disparity" as used herein can be more formally referred to as "screen disparity" (i.e., as measured on the screen) as distinguished from "retinal disparity" and is defined as the difference of the physical x coordinates of corresponding points in the right and left images in a pair of aligned stereo images displayed on a screen. The less formal term "disparity" will be used herein for simplicity. By convention, when disparity is negative (e.g. when the left-eye image is rendered on the screen to the right of the right-eye image), the object is perceived as being in front of the plane of the screen. When disparity is positive (e.g. when the left-eye image is rendered on-screen to the left of the right-eye image), the object is perceived as being behind the screen plane.

The term "disparity data" can refer to any data indicating the disparity value to be used in rendering a given graphical object, such as a caption window and its associated text. The term can also be used more generally to refer to data reflecting the z-axis positions of objects in the current scene. The scene area can be mapped out into regions, with the z-axis position of the object in each region that is closest to the viewer recorded as a coordinate in the map. Such a map may be called a "disparity map" or a "depth map." Disparity maps can change on a frame-by-frame basis and can be represented in any number of ways. It is noted that disparity is a measure of the horizontal offset of left eye and right eye images, but the offset need not be in an integer number of pixels as fractional pixel offsets are perfectly acceptable.

Within the context of delivery of 3D video and CC content for display, disparity is generally represented as a percentage of the width of the accompanying video. As such, it is a dimensionless number. For example, the signaling scheme may specify that one unit of disparity is equal to 1/1920 of the width of the video content. But, a disparity of 1/1920 is not the minimum increment in actual disparity even with a screen width of 1920 pixels. With this definition, a disparity of 7 refers to a distance equal to 7/1920 of the width of the video content. Again with this definition, in the special case of a screen with 1920 pixels of horizontal resolution, this works out such that one full unit of disparity is the same width as one display pixel, but this should be thought of as a special case. If a display screen has fewer than 1920 horizontal pixels, e.g., 1600 horizontal pixels, then disparity is scaled accordingly and a disparity of 7 equates to (7/1920)(1600)=5.83 pixels. Hence, disparity should most properly be viewed as the difference in the physical location on the screen along the x axis (horizontal) of corresponding points in left eye and right eye images in a pair of aligned stereoscopic images. It is also noteworthy that the CC window will generally be a two dimensional window which is positioned along the z-axis and which is perceived to be in a plane parallel to the plane of the display screen.

The subject matter herein addresses a problem involving the transport of data to support 3D caption services. A method is needed to deliver data in the DTV Caption Channel of CEA-708 compliant devices that can as nearly as possible be assured to be backwards-compatible with legacy (existing, fielded) caption decoders. One possibility is to use the Extended Channel as described in U.S. patent application Ser. No. 13/022,810 filed Feb. 8, 2011 entitled "EXTENDED COMMAND STREAM FOR CLOSED CAPTION DISPARITY", to Eyer et al., which is hereby incorporated in its entirety by reference. In the aforementioned application an Extended Service number is used to carry disparity data.

Closed captioning data for 3D audio/video content includes both the definition of caption window attributes and text as well as the disparity data specifying the z-axis position (depth) that each caption window is to be rendered on top of 3D video. In some content creation and distribution scenarios, a 2D version of the same content is distributed to receivers through a different path (for example, to be broadcast on a different channel on cable). The same closed captioning data, including disparity data, may accompany the 2D version of the content. Since the 2D version of the content is processed by non-3D-capable receivers (which may be called "legacy" receivers), the disparity data should be properly disregarded, or skipped over, when the captioning data is processed.

The CEA standard for advanced captioning, CEA-708, included a number of provisions intended to allow future extensions to the standard to be made. Using one of these extensions for the addition of disparity data would seem to be a logical choice, however implementations of CEA-708 caption decoders have been found to be deficient with respect to the way they handle some of these extensions. The CEA-708 standard has been found to be unclear or confusing in some areas, a fact that contributes to implementation errors or omissions.

Methods have been sought to minimize the possibility that legacy decoders are adversely affected by the presence of disparity data in the captioning stream. A method described herein involves delivering disparity data within a separate caption service that is known to be associated with one of the Standard caption services.

The CEA-708 advanced captioning standard supports multiple simultaneous caption services so that, for example, captioning in different languages can be offered for the same program. CEA-708 defines a "minimum decoder" in Section 9. A minimum decoder is required to process the "Standard"

service numbers 1 through 6. Processing "Extended" services 7 through 63 is optional. Quoting from CEA-708, "Decoders shall be capable of decoding all Caption Channel Block Headers consisting of Standard Service Headers, Extended Service Block Headers, and Null Block headers."

One of the disparity data transport methods described herein involves placing the 3D data in an "Adjunct Data" service. In this approach Standard Service Number 6 is recognized as the Adjunct Data service according to the preferred implementation. Service 6 may therefore carry data that is used by the receiver to render caption Services 1 thorough 5, as well as Service 6.

A system could be designed where caption service 6 (or some other Standard service number in the 1-6 range) could carry 3D data for one or more Standard services. Within Standard Service #6, for example, signaling can be present to associate a certain block of 3D data with a particular one of the Standard services (1-6). In the above-referenced patent application wherein Extended services are used, it is submitted that use of Standard services for transmission of disparity data would be awkward and inefficient. However, upon further study, it is noted that in real world situations it is rare for more than one or two of the Standard service numbers (usually services 1, 2 and perhaps rarely 3) to be used. Hence, although seemingly awkward and inefficient, in real world applications, this turns out not to be the case. So, while the above-referenced patent application devises a solid solution to the problem of transport of the disparity data by use of Extended Services, there remains the theoretical issue of compatibility with all legacy receiver devices.

An additional aspect of previously disclosed subject matter involves the method where the data structure used to transport the 3D disparity data uses an extensibility feature of CEA-708 called the "variable-length" command as defined in CEA-708-D Sec. 7.1.11.2. Such a method is not recognized to be suitable for use within the context of most Standard services because it is believed that a significant population of legacy receivers exist that are not able to handle this feature. Such receivers would likely display garbled caption output on-screen if they would encounter one of these Variable Length Commands. However, if the disparity data is delivered in a Standard Service #6 service block, this is not a problem unless a case arises in which all six Standard Services are in use simultaneously. In current practice, it is rare that even two simultaneous caption services are used. Programs captioned in both English and Spanish are somewhat rare, but do occur. Programs captioned in more than two simultaneous languages are seldom if ever produced. Therefore, placing a variable-length command in Service #6 is not disruptive to current and most contemplated caption services delivery.

It is believed that all existing receivers are able to properly skip service blocks corresponding to service numbers they are not currently decoding. Furthermore, proper handling in the receiver of Standard caption services 1-6 is required by FCC rules. If any legacy receiver attempts to decode disparity data (which should not normally occur, as caption services containing disparity data are not announced in the Caption Service Descriptor), if the receiver is built according to CEA-708-D, it will simply disregard the contents of the command.

Summarizing from above, several problems to be addressed are:
1. The need for a delivery method for 3D disparity data that is compatible with legacy devices (e.g. does not produce anomalous output when they are processing the caption data for a 2D version of the broadcast).
2. Delivering 3D data in an Extended Service (a caption service in the "extended" range 7-63) is quite workable, but may not represent the safest solution for helping to assure legacy compatibility due to the extra byte in the service block.
3. When 3D disparity data is sent in the caption service identified with a Standard Service such as Service #6, the 3-bit Standard Service Number of the 2D service this 3D data is linked to is included in each variable-length command.
4. 3D disparity data in Standard Service #6 could possibly be decoded by a legacy decoder (if the user were to select Service #6 in a menu). In this case, the legacy device, if built compliant to CEA-708-D, would decode correctly—it should simply discard the 3D data as an unsupported command.

To optimize compatibility with legacy decoders (while not being able to absolutely guarantee that all legacy decoders would be able to properly disregard the new command), the Variable Length Command as defined in CEA-708-D Sec. 7.1.11.2 can be used. Such commands use the "C3" command ("C3 Code Set—Extended Control Code Set 2"). If properly implemented, legacy decoders should skip variable length commands further assuring that they will not take an unpredictable action.

Hence, in order to help assure that legacy decoders will not malfunction due to attempting to process disparity data, Standard Service #6 (in the example preferred implementation) is used to transport the disparity data. To further prevent legacy decoders from attempting to render the services, a variable-length command can be used to define the disparity data in any suitable manner. While some legacy decoders may not properly implement the "skip variable length extensions" feature as defined in CEA-708, viewers may not be given an option to choose Standard Service #6 anyway since it is an "unannounced" service. Unless all six Standard Services actually carry caption services (a situation that is currently believed to be extremely rare if in existence at all), Service #6 will not be announced in the Caption Service Descriptor (CSD) defined in ATSC A/65 Program and System Information Protocol (PSIP).

Figure 1:
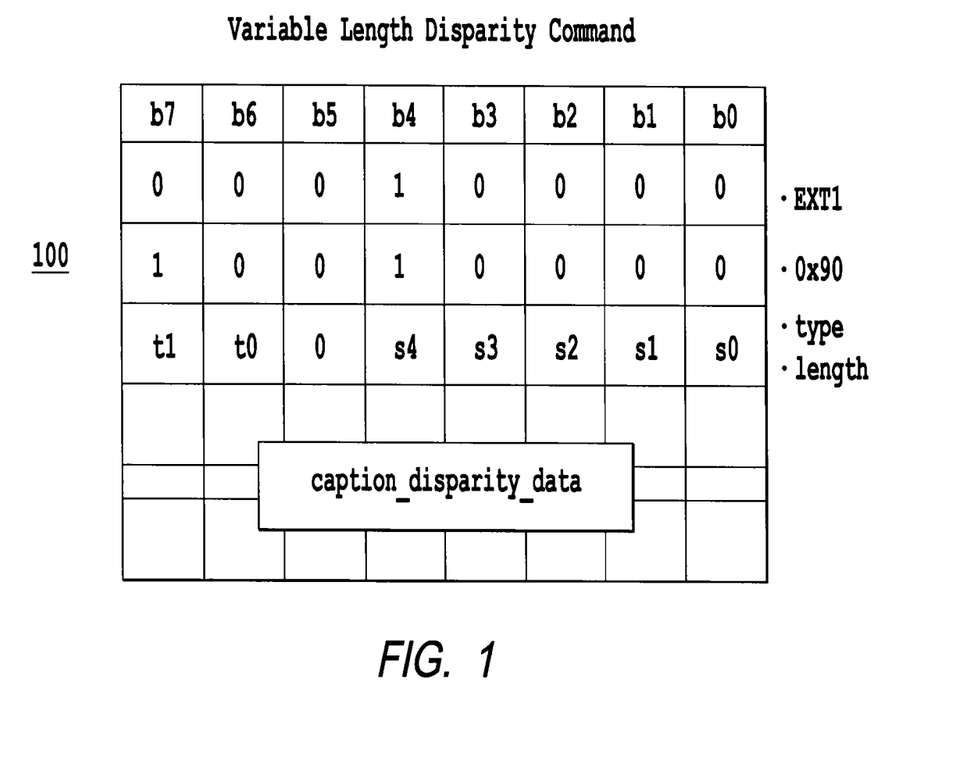
FIG. 1 is an example caption_disparity_data( ) command arrangement consistent with certain embodiments of the present invention.

An example variable length disparity command is depicted as 100 in FIG. 1. As specified in CEA-708-D Section 7.1.11.2, variable-length commands are indicated by the EXT1 character followed by a number in the range 0x90 to 0x9F, where the "0x" notation denotes a number represented in hexadecimal format. In the command format depicted in FIG. 1, the EXT1 character (0x10) is followed by 0x90. In this context, 0x90 is the command identifier for the SetDisparity command. In accordance with the syntax defined in CEA-708-D Section 7.1.11.2, the next byte contains a two-bit Type field, a zero bit, followed by a 5-bit length field.

The caption_disparity_data( ) data structure follows the byte containing the length field. The syntax of one example of the caption disparity data is depicted in pseudocode in the TABLE below which will be described in detail at that point.

Figure 2:
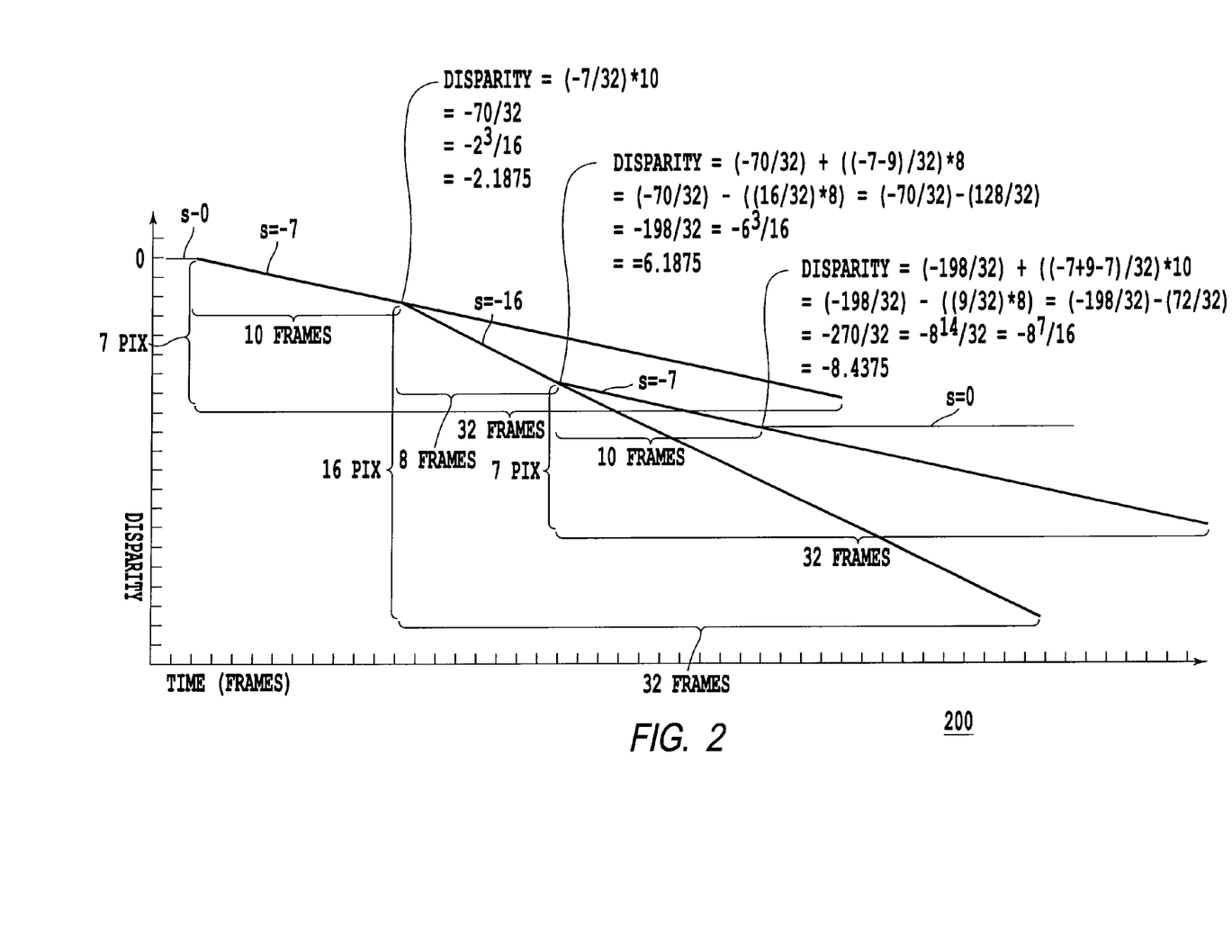
FIG. 2 is an example of a piecewise linear approximation of authored disparity data consistent with certain embodiments of the present invention.

FIG. 2 is an example of a piecewise linear approximation of authored disparity data consistent with certain embodiments of the present invention as explained in U.S. patent application Ser. No. 13/022,817 as referenced above.

Figure 3:
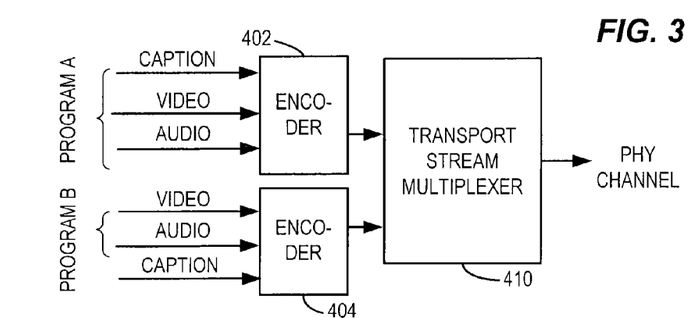
FIG. 3 is an example encoder consistent with certain embodiments of the present invention.

Referring now to FIG. 3, a basic diagram of a service provider such as a broadcaster is depicted. Generally speaking, a single service provider may provide multiple programs over one or more transport streams. The audio, video and caption data are provided to an encoder which encodes the data into packets suitable for distribution, including caption data packets as described above. As shown, Program A and Program B are encoded by encoders 402 and 404 which are then provided to a transport stream multiplexer 410 which then provides an output that can be distributed via a physical channel medium such as cable or satellite broadcast.

Figure 4:
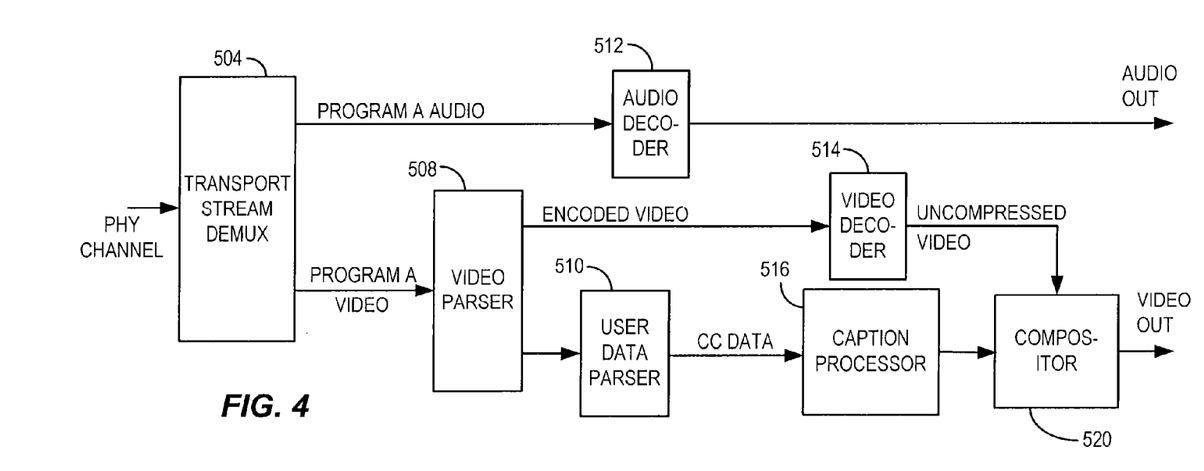
FIG. 4 is an example decoder consistent with certain embodiments of the present invention.

This encoded data from the physical channel is received at a television receiver device (e.g., a television or a set top box) as depicted in FIG. 4. The transport stream is demultiplexed at transport stream demultiplexer 504 to produce one or more program streams including audio, video and caption data (as well as possibly other data not shown). Video packets from Program A are passed from demultiplexer 504 to video parser 508. Audio packets from Program A are passed from demultiplexer 504 to audio decoder 512 which in turn produces the audio output. Video parser 508 extracts video packets from the video stream and passes them to video decoder 514. Video parser 508 extracts user data from the video stream and passes it to user data parser 510. User data parser 510 extracts closed captioning data from within user data packets and passes it to caption processor 516. Within the caption processor 516, caption service blocks containing data for caption services other than the one of interest are filtered out and discarded. When the video content is 3D, caption processor 516 processes caption service blocks corresponding to the Main service of interest, while at the same time processing caption service blocks corresponding to the mapped Adjunct Data service. The output of caption processor 516 is the graphical representation of the closed captions, typically text enclosed in caption windows. For 3D content, the output of caption processor 516 is separate outputs of captioning for the left-eye view and the right eye views, with appropriate disparity applied to establish the perceived depth (z-plane position) of each caption window.

The caption graphics are composited at compositor 520 with the video data so as to produce 3D video with captions placed according to the data in the caption data packets in the x, y and z plane. Such data may place the captions in the z-axis in a static manner or dynamically in accordance with the authoring of the caption data.

Figure 5:
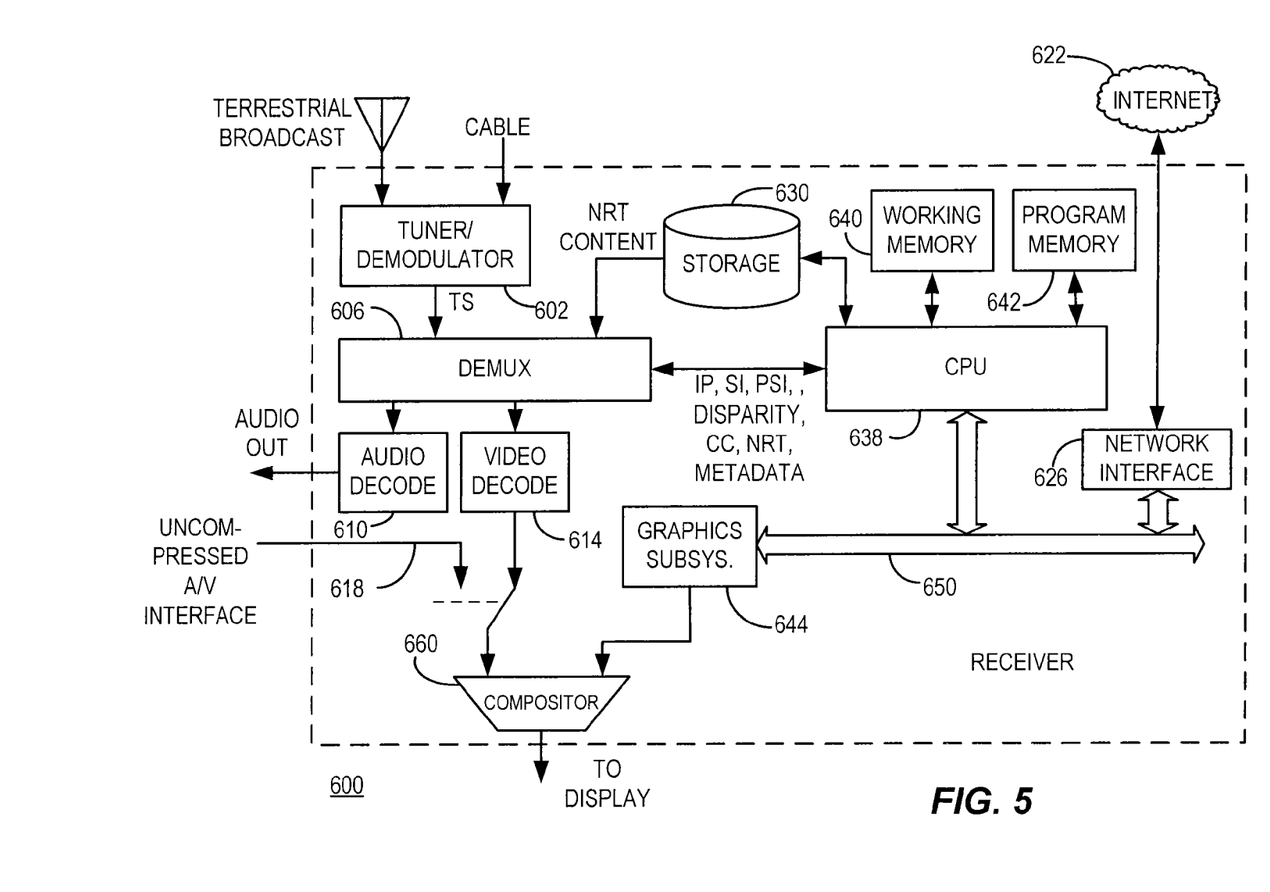
FIG. 5 is an example television receiver device consistent with certain embodiments of the present invention.

A receiver device is depicted in greater detail in FIG. 5 wherein content is received via any suitable source such as terrestrial broadcast, cable or satellite at a receiver 600's tuner/demodulator 602. The transport stream from the tuner/demodulator 602 is demultiplexed at demultiplexer 606 into audio and video streams. The audio is decoded at an audio decoder 610 while the video is decoded at a video decoder 614. Uncompressed A/V data may also be received via an uncompressed A/V interface 618 that can be selectively utilized.

A/V content may also be received via the Internet 622 via a network interface 626 for IP television content decoding. Additionally, storage 630 can be provided for non-real time (NRT) stored content. The NRT content can be played by demultiplexing at 606 in a manner similar to that of other sources of content. The receiver generally operates under control of a processor such as CPU 638 which is interconnected to working memory 640 and program memory 642 as well as a graphics subsystem 644 via one or more buses such as 650.

The CPU 638 receives closed caption data from the demultiplexer 606 as well as the disparity data via the mechanism described herein and determines by parsing the data in the Adjunct Data service what z-position as well as x and y position to locate the caption data. This information is passed to the graphics subsystem 644 and the images are composited at the compositor 660 to produce an output suitable for processing and display on a video display.

The following methods overcome potential problems present with alternative delivery and transport methods. The following methods use a Standard service for transport since using a Standard service for transport is likely to be the safest possible way to ensure legacy compatibility.

In accord with this approach, Standard service #6 (or another Standard service number n=any of services 1 through 6) is defined as the Adjunct Data service. Characteristics of the Adjunct Data service include:

Formatted as a Variable Length command (see CEA-708-D Section 7.1.11.2 Variable Length Codes from 0x90 to 0x9F) so that properly designed receivers will discard the contents of the packets;

Not announced in the PSIP Caption Service Descriptor (thus properly designed receivers will not announce and offer the service containing Adjunct Data to the user);

Includes 3D data for Standard Services #1 through #6 (which service a particular block of data is associated with is signaled in the data structure; see below).

This method overcomes the following potential problems:

a. All legacy receivers may not be designed to properly disregard Extended service packets. This is because the data structure for the CEA-708-D Service Block (see Table 9 in CEA-708-D) includes one extra byte when the service_number field='111' (decimal 7). Therefore use of the Extended services may be potentially be problematic.

The present subject matter places Adjunct Data in Standard service packets. All legacy decoders should be able to handle the presence of Standard service packets and are able to filter out packets corresponding to services they are not set to decode (non-selected services).

b. Some legacy receivers may not use the PSIP Caption Service Descriptor (CSD) to create the user interface for selection of caption services. In this case, it could be possible for the user to select caption Service #6 (the Adjunct Data channel) and attempt to decode it. The proposed method uses a "variable-length" command which would be unknown to the receiver. Receivers are expected to discard unsupported commands, thus they should be able to skip the proper number of bytes in order to discard the command. In this case, nothing would be displayed for Service #6.

Even in the case that something were to be displayed (garbage characters or whatever), the user would decide this is not a good caption service and would choose a better one. Hence, no harm would be done.

Since there may be multiple services carrying 3D captions (different languages, for example), the method should accommodate the transport of different disparity data for each service. This is accomplished using the service_linkage field as described below in formatting as would be used in a technical standard.

Set Disparity—(DISP)
  Name: SetDisparity—Specify disparity for 3D captioning
  Format: Variable-length
  Command Coding: EXT1, 90h, Caption_disparity_data( )

| Caption_disparity_data( ) | | | | | | | | |
| --- | --- | --- | --- | --- | --- | --- | --- | --- |
| $b_7$ | $b_6$ | $b_5$ | $b_4$ | $b_3$ | $b_2$ | $b_1$ | $b_0$ | |
| 0 | 0 | 0 | 1 | 0 | 0 | 0 | 0 | EXT1 |
| 1 | 0 | 0 | 1 | 0 | 0 | 0 | 0 | 90h (variable length) |

Description: Caption disparity data shall be transported in a SetDisparity command within the Adjunct Service using the syntax and semantics defined below. SetDisparity specifies the amount of horizontal offset between the left- and right-eye views (screen disparity) for one or more caption windows when captioning is used with stereoscopic 3D programming.

Caption Disparity Data
The syntax of Caption_disparity_data( ) shall be as shown in the following TABLE:

TABLE

Caption Disparity Data Syntax

|  | No. of bits | Format | No. of Bytes |
|---|---|---|---|
| Caption_disparity_data( ) { |  |  |  |
|   Reserved | 2 | '11' | 1 |
|   Zero | 1 | '0' |  |
|   command_length | 5 | uimsbf |  |
|   service_linkage | 3 | uimsbf | 1 |
|   reserved | 2 | '11' |  |
|   caption_window_count | 3 | uimsbf |  |
|   for ( i=0 ; i < caption_window_count; i++ ) { |  |  |  |
|     caption_window_id | 3 | uimsbf | 2 |
|     temporal_extension_flag | 1 | bslbf |  |
|     reserved | 3 | '111' |  |
|     disparity[i] | 9 | simsbf |  |
|     if (temporal_extension_flag) { |  |  |  |
|       alternate_disparity[i] | 9 | simsbf | 2 |
|       reserved | 2 | '11' |  |
|       segment_count | 5 | uimsbf |  |
|       for (k=0; k<segment_count; k++) { |  |  |  |
|         frame_count | 5 | uimsbf | 1.25 |
|         segment_slope_change | 5 | simsbf |  |
|       } |  |  |  |
|       for (m=0; m<(3-((segment_count-1) mod 4)); m++) { |  |  |  |
|         reserved | 2 | '11' | 0.25 |
|       } |  |  |  |
|     } |  |  |  |
|   } |  |  |  |
| } |  |  |  |

The terms used in the above table are defined as follows:

command_length—a 5-bit unsigned integer in the range 3 to 27 that shall indicate the number of bytes to follow in this instance of Caption_disparity_data( ).

service_linkage—a 3-bit unsigned integer in the range 1 to 6 that shall indicate which Standard caption service this instance of Caption_disparity_data( ) is associated with.

caption_window_count—a 3-bit unsigned integer in the range 1 to 7 that shall indicate the number of caption windows included in this instance of the Caption_disparity_data( ).

caption_window_id—a 3-bit unsigned integer that shall identify the Window ID in the corresponding service for which disparity data is being given in this iteration of the "for" loop.

temporal_extension_flag—a 1-bit flag that, when set to "1", shall indicate data is included that identifies a time-varying disparity path. When set to "0" the flag shall indicate that the last field present in the command is disparity[i].

disparity[i]—a 9-bit 2's complement signed integer that shall indicate the disparity value of the associated caption window, i, given in caption_window_id, relative to 1920 horizontal pixels. Value zero shall reference the screen plane. Negative values shall correspond with perceived depths in front of the screen. Positive values shall correspond with perceived depths behind the screen.

alternate_disparity[i]—a 9-bit 2's complement signed integer that shall be coded the same as disparity[i]; it shall specify a disparity value that may be used in place of the values given in the piecewise-linear path by decoders that are not able to render time-varying caption windows.

segment_count—a 5-bit unsigned integer in the range 1 to 31 that shall indicate the number of segments to follow.

frame_count—a 5-bit unsigned integer in the range 0 to 31 that shall indicate the number of video frames that shall elapse prior to the application of the segment_slope_change field immediately following.

segment_slope_change—a 5-bit 2's complement signed integer in the range −16 to +15 that shall indicate the amount of change in slope to apply at the frame indicated in frame_count. Slopes are specified in number of pixels of disparity over 32 frames. A slope value of zero shall be assumed at the starting point of the time-varying path.

Figure 6:
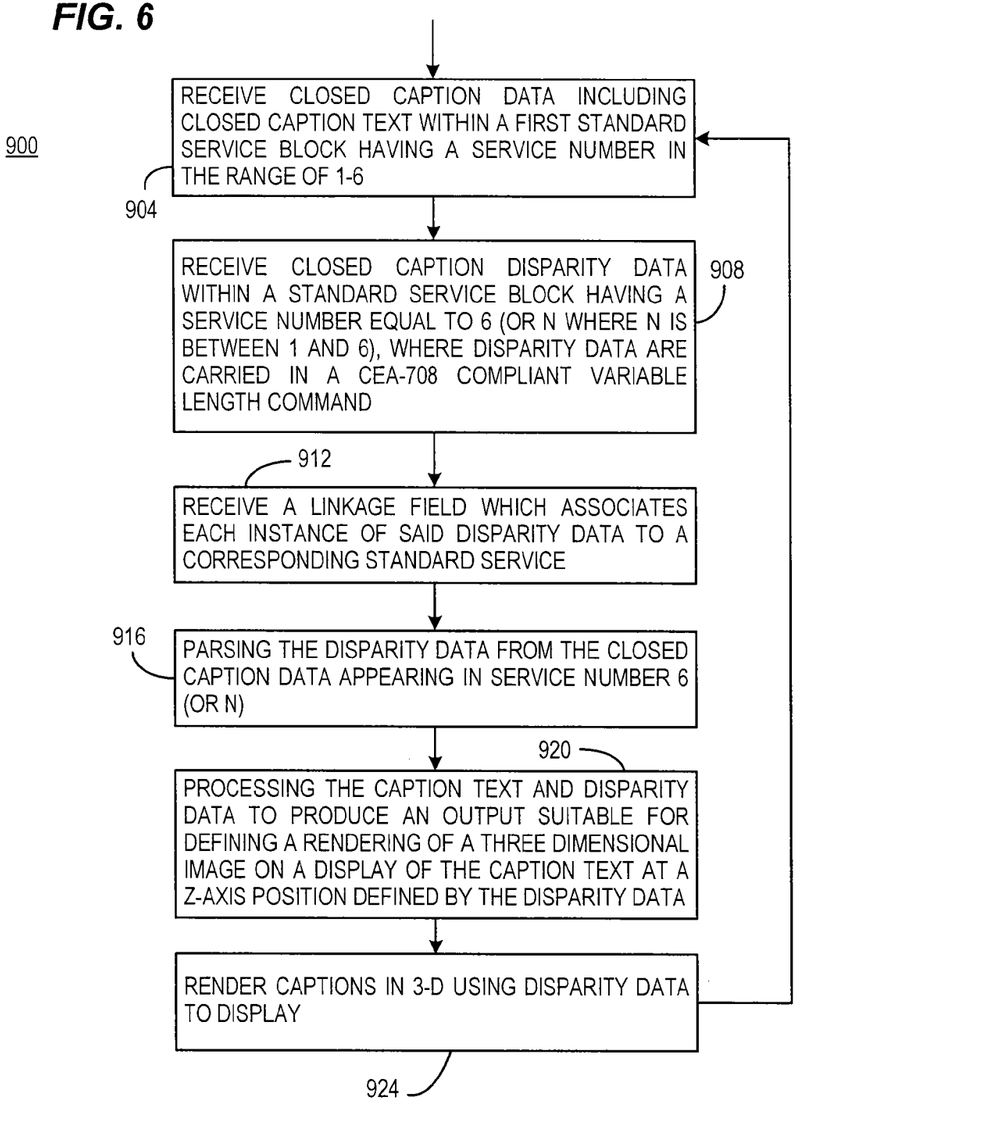
FIG. 6 is an example flow chart of a process consistent with certain embodiments of the present invention.

Referring now to FIG. 6, an example method of processing disparity data for closed captions for three dimensional video is depicted in flow chart 900. The process begins at 904 where closed caption data including closed caption text is received within a first Standard service block having a service number in the range of 1-6. At 908, closed caption disparity data are received within a Standard service block having a service number equal to 6. In general, the Standard service used for the disparity data could be any of service numbers n between 1 and 6, but since it is relatively rare for more than the first few of the service numbers to be used for caption text data, service number 6 is preferred. A linkage field is also received at 912, which associates each instance of the disparity data to a corresponding Standard service so that the receiver can correctly utilize the disparity data with the closed caption text for which it is intended to be associated.

At 916, the receiver parses (e.g., in a parsing computer process module) the disparity data from the closed caption data appearing in service number 6 (or n). The caption text and disparity data are then processed at 920 (e.g., in another processor operation) to produce an output suitable for defining a rendering of a three-dimensional image on a display of the caption text at a z-axis position defined by the disparity data. The caption text data can then be rendered at 924 as 3D stereoscopic images on the display within the closed caption window. Preferably, the above-referenced disparity data are carried in a CEA-708 compliant variable length command.

Figure 7:
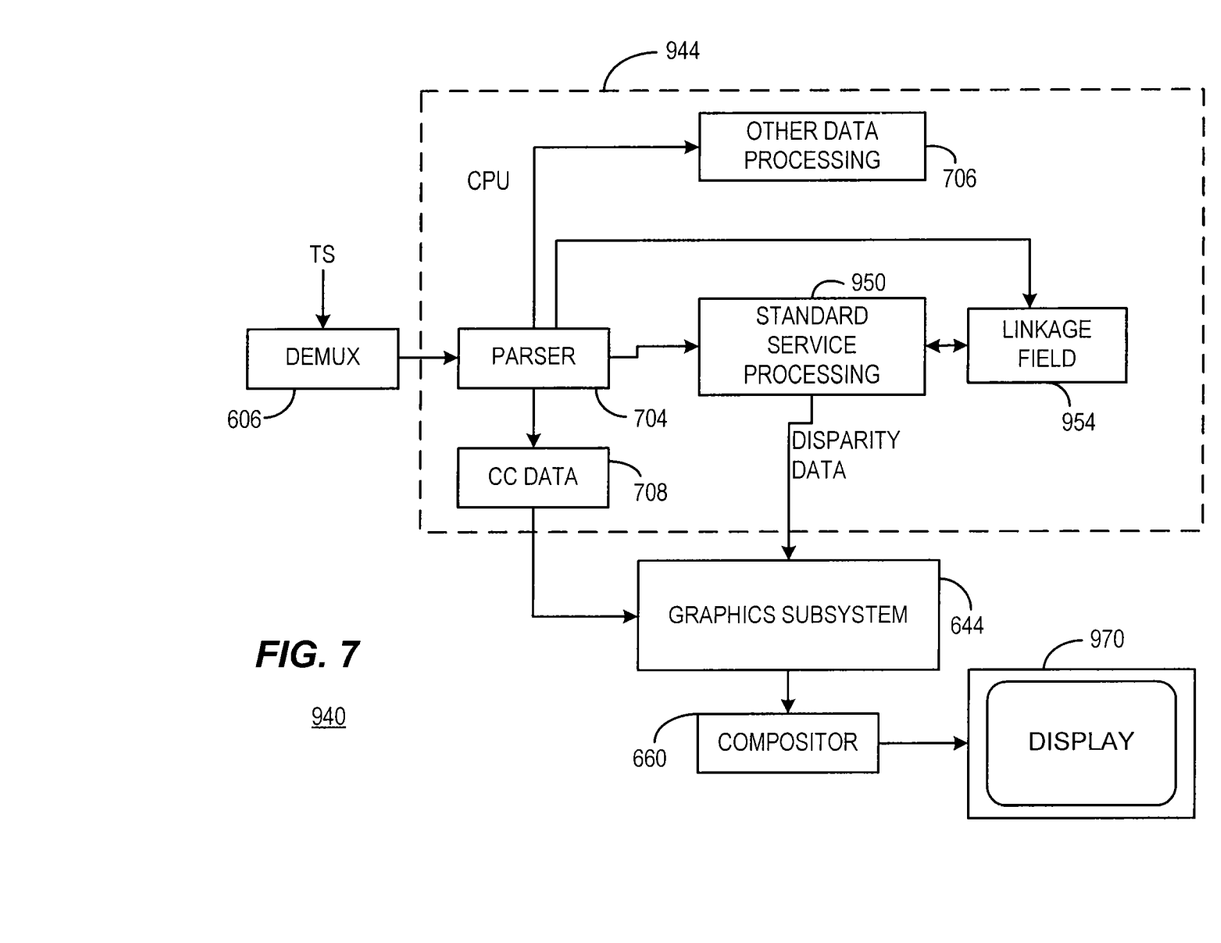
FIG. 7 is an example implementation block diagram of a television receiver device consistent with certain embodiments of the present invention.

Referring now to FIG. 7, an example television receiver system is depicted in which the numbered blocks correspond to the same functions described in connection with those of FIG. 5, with exceptions as noted below. In this system 940, CPU 944 receives the demultiplexed digital television stream containing Standard service numbers within the range of 1-6. These are parsed at parser 704 and sent to the Standard service processing block 950. The parser 704 additionally parses out a linkage field 954 that is provided to the Standard service processing 950 for determination of the disparity data associated with the closed caption data from 708 and parses other data for other data processing at 706. This disparity data are passed to the graphics subsystem 644 for processing to compositor 660 for display on a display such as display 970 as stereoscopic 3D closed caption text in the closed caption window.

Thus, a method of processing disparity data for closed captions for three dimensional video involves receiving closed caption data including closed caption text within a first Standard service block having a service number in the range of 1-6; receiving closed caption disparity data within a Standard service block having a service number equal to 6; receiving a linkage field which associates each instance of said disparity data to a corresponding Standard service; parsing the disparity data from the closed caption data appearing in service number 6; processing the caption text and disparity data to produce an output suitable for defining a rendering of a three dimensional image on a three dimensional television display of the caption text at a z-axis position defined by the disparity data; where the disparity data are carried in a CEA-708 compliant variable length command; and displaying the closed caption text as a stereoscopic image on the three dimensional television display.

Another method of processing disparity data for closed captions for three dimensional video involves receiving closed caption data including closed caption text within a first Standard service block having a service number in the range of 1-6; receiving closed caption disparity data within a Standard service block having a service number equal to n, where in is between 1 and 6; receiving a linkage field which associates each instance of said disparity data to a corresponding Standard service; parsing the disparity data from the closed caption data appearing in service number n; and processing the caption text and disparity data to produce an output suitable for defining a rendering of a three dimensional image on a display of the caption text at a z-axis position defined by the disparity data.

In certain implementations, the disparity data are carried in a CEA-708 compliant variable length command. In certain implementations, the Standard service number n equals service number 6. In certain implementations, the method further involves displaying the closed caption text as a stereoscopic image on the display.

Another method of processing disparity data for closed captions for three dimensional video involves receiving closed caption data including closed caption text within a service block having a service number in the range of 1-6; receiving closed caption disparity data within a Standard service block having service number equal to 6; receiving a linkage field which associates each instance of said disparity data to a corresponding Standard service block; parsing the disparity data from the closed caption data appearing in service number 6; and processing the caption text and disparity data to produce an output suitable for defining a rendering of a three dimensional image on a display of the caption text at a z-axis position defined by the disparity data.

In certain implementations, the disparity data are carried in a CEA-708 compliant variable length command. In certain implementations, the method further involves displaying the closed caption text as a stereoscopic image on the display.

A tangible computer readable storage medium such as a non-transitory storage medium or other storage device can store instructions that when executed on one or more programmed processors execute any of the methods disclosed herein.

A television receiver device that processes disparity data for closed captions in accord with certain implementations has a receiver that receives closed caption data including closed caption text within a service block having a service number in the range of 1-6. The receiver further receives closed caption disparity data within a Standard service block having a service number equal to n, where in is between 1 and 6. The receiver further receives a linkage field which associates each instance of said disparity data to a corresponding Standard service. One or more processors act as parsers that parse the disparity data from the closed caption data appearing in service number n. The one or more processors process the caption text and disparity data to produce an output suitable for defining a rendering of a three dimensional image on a display of the caption text at a z-axis position defined by the disparity data. A compositor receives and processes the disparity data and the caption text to produce an output suitable for defining a rendering of a three dimensional image on a display of the caption text at a z-axis position defined by the disparity data.

In certain implementations, the disparity data are carried in a CEA-708 compliant variable length command. In certain implementations, the Standard service number n equals service number 6. In certain implementations, the receiver device further has a display such as a three dimensional television displaying the closed caption text as a stereoscopic image produced by the compositor.

Another television receiver device that processes disparity data for closed captions has a receiver that receives closed caption data including closed caption text within a service block having a service number in the range of 1-6. The receiver further receives closed caption disparity data within a Standard service block having a service number equal to n, where n is between 1 and 6. The receiver further receive a linkage field which associates each instance of said disparity data to a corresponding Standard service. A parser parses the disparity data from the closed caption data appearing in service number n. One or more processors process the caption text and disparity data to produce an output suitable for defining a rendering of a three dimensional image on a display of the caption text at a z-axis position defined by the disparity data. A compositor receives and processes the disparity data and the caption text to produce an output suitable for defining a rendering of a three dimensional image on a display of the caption text at a z-axis position defined by the disparity data.

In certain implementations, the disparity data are carried in a CEA-708 compliant variable length command. In certain implementations, the Standard service number equals service number 6. In certain implementations, a three dimensional television display displays the closed caption text as a stereoscopic image produced by the compositor.

Another television receiver device that processes disparity data for closed captions has a three dimensional television display and a receiver that receives closed caption data including closed caption text within a service block having a service number in the range of 1-6. The receiver further receives closed caption disparity data within a Standard service block having a service number equal to 6. The receiver further receives a linkage field which associates each instance of said disparity data to a corresponding Standard service. A parser parses the disparity data from the closed caption data appearing in service number n. One or more processors process the caption text and disparity data to produce an output suitable for defining a rendering of a three dimensional image on the display of the caption text at a z-axis position defined by the disparity data. A compositor receives and processes the disparity data and the caption text to produce an output suitable for defining a rendering of a three dimensional image on the display of the caption text at a z-axis position defined by the disparity data. The disparity data are carried in a CEA-708 compliant variable length command.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of a reception apparatus for processing closed caption data, comprising:
   receiving, by circuitry of the reception apparatus, audio, video, and closed caption data, the closed caption data including closed caption text in Standard caption Service #1 and additional data in Standard caption Service #6;
   receiving, by the circuitry, caption service information that announces the Standard caption Service #1 and does not announce the Standard caption Service #6;
   parsing the additional data from the closed caption data included in the Standard caption Service #6; and
   outputting, by the circuitry, a presentation of the video data for display to a user of the reception apparatus based on the parsed additional data included in the Standard caption Service #6.

2. The method according to claim 1, wherein the closed caption text is associated with the audio data.

3. The method according to claim 1, wherein the additional data includes closed caption disparity data for displaying the closed caption text in the Standard caption Service #1.

4. The method according to claim 3, wherein the closed caption disparity data includes a linkage field which associates the closed caption disparity data with the closed caption text in the Standard caption Service #1.

5. The method according to claim 1, wherein the additional data are carried in a CEA-708 compliant variable length command.

6. The method according to claim 1, further comprising:
   outputting the closed caption text for display as a stereoscopic image in the presentation.

7. A non-transitory computer readable medium storing instructions that when executed by a computer causes the computer to perform a method for processing closed caption data, the method comprising:
   receiving, audio, video, and closed caption data, the closed caption data including closed caption text in Standard caption Service #1 and additional data in Standard caption Service #6;
   receiving caption service information that announces the Standard caption Service #1 and does not announce the Standard caption Service #6;
   parsing the additional data from the closed caption data included in the Standard caption Service #6; and
   outputting a presentation of the video data for display to a user of the reception apparatus based on the parsed additional data included in the Standard caption Service #6.

8. A reception apparatus, comprising:
   circuitry configured to
   receive, audio, video, and closed caption data, the closed caption data including closed caption text in Standard caption Service #1 and additional data in Standard caption Service #6;
   receive caption service information that announces the Standard caption Service #1 and does not announce the Standard caption Service #6;
   parse the additional data from the closed caption data included in the Standard caption Service #6; and
   output a presentation of the video data for display to a user of the reception apparatus based on the parsed additional data included in the Standard caption Service #6.

9. The reception apparatus according to claim 8, wherein the closed caption text is associated with the audio data.

10. The reception apparatus according to claim 8, wherein the additional data includes closed caption disparity data for displaying the closed caption text in the Standard caption Service #1.

11. The reception apparatus according to claim 10, wherein the closed caption disparity data includes a linkage field which associates the closed caption disparity data with the closed caption text in the Standard caption Service #1.

12. The reception apparatus according to claim 8, wherein the additional data are carried in a CEA-708 compliant variable length command.

13. The reception apparatus according to claim 8, wherein the circuitry is configured to:
   output the closed caption text for display as a stereoscopic image in the presentation.

* * * * *